United States Patent [19]

Davis

[11] 4,095,624
[45] Jun. 20, 1978

[54] PRESSURE TANK

[76] Inventor: Elisha C. Davis, 1344 Davis Ave., Enumclaw, Wash. 98022

[21] Appl. No.: 635,463

[22] Filed: Nov. 26, 1975

[51] Int. Cl.² .............................................. B65B 3/04
[52] U.S. Cl. ..................................... 141/18; 9/11 A; 9/321; 222/3; 280/737
[58] Field of Search ................... 42/1 G, 1 Z; 102/39; 141/2, 3, 18, 19, 4; 9/11 A, 321; 280/736, 737; 222/3, 399

[56] References Cited

U.S. PATENT DOCUMENTS

| 610,127 | 8/1898 | Durafort | 141/19 |
|---|---|---|---|
| 2,630,942 | 3/1953 | Shaffer | 141/19 |
| 3,180,373 | 4/1965 | Hebenstreit | 141/4 |
| 3,232,485 | 2/1966 | Wilson | 141/18 X |
| 3,558,010 | 1/1971 | Zenger et al. | 141/19 X |
| 3,749,282 | 7/1973 | Day et al. | 280/737 |
| 3,833,029 | 9/1974 | Munn | 141/4 |
| 3,868,124 | 2/1975 | Johnson | 141/4 X |

Primary Examiner—Richard E. Aegerter
Assistant Examiner—Frederick R. Schmiddt
Attorney, Agent, or Firm—Joseph E. Rusz; Arsen Tashjian

[57] ABSTRACT

A pressurized storage tank including a chamber in the base thereof for holding a cartridge containing gas producing combustible material which is discharged by causing a firing pin to strike a primer. A check valve in communication with the chamber and tank interior allows the gas from the discharged cartridge to flow in one direction only, from the chamber into the tank. A safety blowout plug prevents over-pressurization and appropriate gauges are provided to measure the internal tank pressure and the outlet line pressure.

4 Claims, 1 Drawing Figure

U.S. Patent June 20, 1978 4,095,624
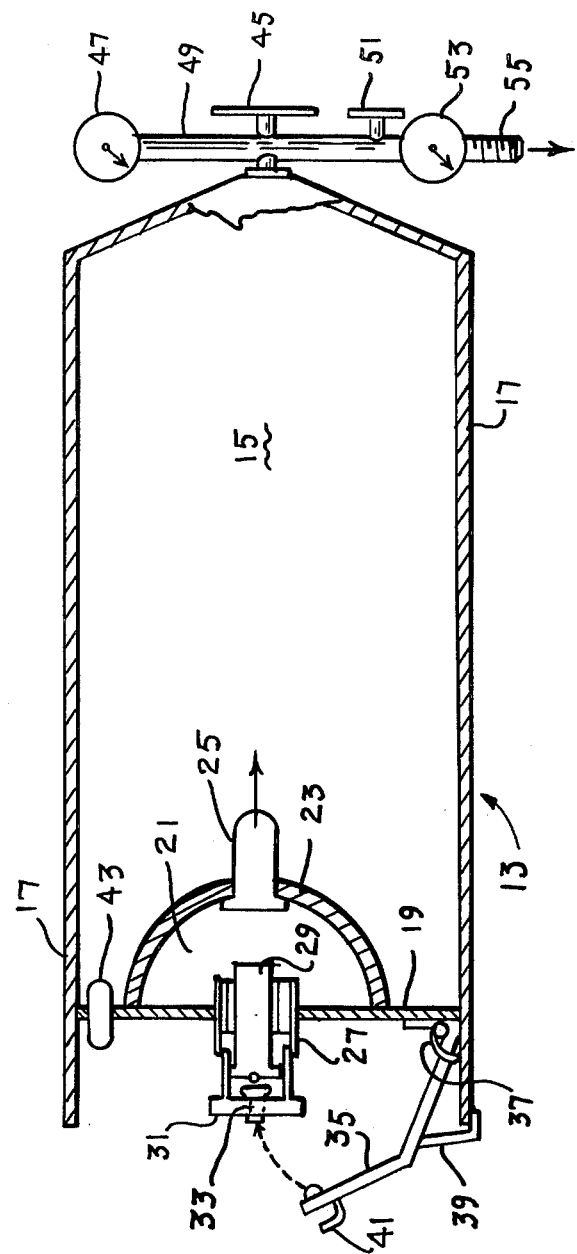

PRESSURE TANK

STATEMENT OF GOVERNMENT INTEREST

The invention described herein may be maufactured and used by or for the Government for governmental purposes without the payment of any royalty thereon.

BACKGROUND OF THE INVENTION

This invention relates to a pressure tank for use in providing a pressurized gas source where needed and, more particularly, the invention is concerned with providing a tank source of pressurized gas produced by discharging a cartridge in a chamber and directing the gases to the interior of the tank.

Heretofore, it has been common to pressurize storage tanks by attaching to compressors or carbon dioxide cartridges and filling the tanks to the desired pressure. Other systems utilize hot combustion gases in combination with liquified carbon dioxide or other refrigerants to produce gas to fill inflatable devices such as boats, rafts, rescue devices, etc. These systems have certain obvious drawbacks including the requirement of a power source to operate the compressor and/or a supply of carbon dioxide cartridges. It can be seen that these requirements necessarily limit the portability of any inflatable device which is in the deflated state. Thus it should be noted that it would be most desirable to provide a gas pressure source which does not require a cumbersome gas generator with the accompanying chemical supply nor require an electrical or gasoline powered compressor. The hereinafter described pressure tank does provide a pressurized gas source without the above-mentioned disadvantages.

SUMMARY OF THE INVENTION

The present invention provides an improved pressurized storage tank compressed gas source for use with an air pressure gun or the like and is characterized by a chamber in the base of the tank for holding a cartridge which contains combustible gas producing material. When the cartridge is discharged, the chamber is pressurized and the gases therein flow through a check valve into the main tank. The process is repeated until the pressure in the main tank reaches the desired level.

Accordingly, it is an object of the present invention to provide a pressure storage tank suitable for storing gas under pressure which can be used for inflating flotation devices or any of numerous circumstances where pressurization is needed on demand.

Another object of the invention is to provide a means for producing a pressurized gas including apparatus which is light in weight and completely portable.

Still another object of the invention is to provide a pressure tank which is simple and economical in construction of readily available material and parts while being safe and reliable in operation.

These and other objects, features and advantages will become more apparent after considering the following description taken in conjunction with the annexed drawings and appended claims.

BRIEF DESCRIPTION OF THE DRAWING

The FIGURE is a side view in partial section of a pressure tank according to the invention showing the details of the cartridge, pressure chamber and firing mechanism in idealized form.

DESCRIPTION OF A PREFERRED EMBODIMENT

Referring to the drawing in detail, the FIGURE depicts a main pressure tank 13 having an interior 15 and side wall 17. The tank 13 is provided with a base 19 which also forms the base of a chamber 21 located at the rearward end of the tank 13. A curved, preferably hemispherical, wall 23 forms the forward wall of the chamber 21 and extends into the interior of the tank 13. A check valve 25 is fixedly positioned in the curved wall 23 of the chamber 21 to allow gases therein to flow into the interior 15 of the tank 13 and to prevent gases in the interior 15 of the tank 13 from flowing back into the chamber 21.

Through the center of the base 19 there is positioned a receptacle 27 for receiving a charging cartridge 29 having its forward end in operative communication with the interior of the chamber 21. The rearward end of the cartridge 29 extends back outside the receptacle 27 leaving the primer affixed thereto exposed. A closure cap 31 having a firing pin 33 slidably positioned in the center thereof closes off the outer end of the receptacle 27 and effectively retains the cartridge 29 in position therein. The firing pin 33 is in alignment with the primer in the cartridge 29 so that a blow from the firing pin 33 will cause the primer of the cartridge 29 to explode.

A spring loaded striker 35 is pivotably attached to the base 19 of the tank 13 by means of the spring biased pivot member 37 which urges the striker 35 to move clockwise. A striker latch 39 holds the striker 35 under load after being pulled back by the handle 41 to the loaded position. The cartridge 29 can now be fired by releasing the striker 35. A safety pressure release valve 43 which may be in the form of a blowout plug is installed in the base 19 of the tank 13 to prevent overpressurization with the resultant dangers of bursting.

A master control valve 45 is operatively connected to the forward wall of the main storage tank 13 for controlling the flow of pressurized gas from the interior 15 of the tank 13. A tank pressure gauge 47 is attached to the line 49 to indicate the pressure in the interior 15 of the main tank 13 and a pressure regulating valve 51 along with a gauge 53 to indicate the outlet pressure is attached in the tank outlet line 55.

In operation, to pressurize the main tank 13, close the master control valve 45 thereby effectively sealing the interior 15 of the main tank 13. Pull back on the spring loaded striker 35 by grasping the handle 41 and moving counterclockwise until the latch 39 attaches to the striker 35 and holds it fast against the force exerted by the spring biased pivot member 37 which urges the striker 35 to move clockwise. Remove the closure cap 31 and install a charging cartridge 29 in the receptacle 27. Replace the closure cap 31 over the base of the installed charging cartridge 29. While holding the striker 35 with one hand by means of the handle 41, unhook the striker latch 39, then release the striker 35 which strikes the firing pin 33 in the closure cap 31. This causes the primer in the base of the charging cartridge 29 to explode and cause the charge to fire. After the cartridge 29 is fired the chamber 21 is filled with gas pressure which then passes through the check valve 25 to the interior 15 of the tank 13 causing the tank to pressurize.

By opening the master control valve 45 while the pressure regulating valve 51 is closed, the tank pressure gauge 47 will give an indication of the pressure inside the tank 13. If the pressure is not high enough for the uses desired, the master control valve 45 can be closed and the process repeated, that is, another cartridge 29 can be fired until the desired pressure is obtained.

From the foregoing description, it can be seen that there is disclosed an improved, relatively simple, lightweight and versatile apparatus which is suitable for producing a pressurized gas for air pressure guns or other purposes where an auxiliary source of pressure is required. The apparatus functions equally well at all extremes of temperature as well as at any altitude.

Although the invention has been illustrated in the accompanying drawing and described in the foregoing specification in terms of a preferred embodiment thereof, the invention is not limited to this embodiment or to the particular configuration mentioned. It will be apparent to those skilled in the art that my invention could have extensive use in other operations where it is desirable to provide a pressure source for inflating rafts, vehicle tires, and other inflatable devices used by the armed forces especially in the field where electrical power and gasoline generators may be unavailable. Also, it should be noted that certain changes, modifications and substitutions can be made, particularly with respect to the positioning of the various valves and gauges without departing from the true spirit and scope of the appended claims.

Having thus set forth and disclosed the nature of my invention, what I claim and desire to secure by Letters Patent of the United States is:

1. A pressure tank for receiving and storing gas under pressure from a gas generating source comprising a main pressure tank having an interior and side walls, a substantially flat base on said tank, a chamber for holding gas operatively attached to said base of said tank, said chamber having a curved forward wall extending into the interior of said tank, a check valve fixedly positioned in the forward wall of said chamber for allowing gases within said chamber to flow into the interior of said tank and for preventing gases in said tank from flowing into said chamber, a receptacle in the base of said tank in operative communication with the interior of said chamber, a replaceable charging cartridge positioned in said receptacle, said cartridge containing combustionable material suitable for producing gases, the forward end of said cartridge in operative communication with the interior of said chamber and the rearward end of said cartridge having a primer disposed therein exposed outside said receptacle, a closure cap removable to replace said charging cartridge and normally enclosing the rearward end of said cartridge positioned in said receptacle, a firing pin positioned in the center of said closure cap adjacent the rearward end of said cartridge, and a pivotally mounted striker operatively attached to the base of said tank for striking said firing pin upon release, said firing pin slidably positioned within said closure cap being urged forward to contact the primer with sufficient force to cause the primer to ignite and produce flames and hot gases causing the combustionable material in said cartridge to ignite thereby producing combustion gases which fill said chamber and pass through said check valve into said main pressure tank raising the pressure therein to a higher level whereby successive cartridges may be ignited to raise the pressure in the main pressure tank to a desired level.

2. The pressure tank defined in claim 1 wherein the forward wall of said chamber is hemispherical in configuration, said check valve being disposed through the forwardmost section of said forward wall in operative engagement with said chamber.

3. The pressure tank defined in claim 1 wherein a pressure release valve is positioned in the base of said tank for preventing over-pressurization of said tank.

4. The pressure tank defined in claim 1 wherein a master control valve is operatively attached to an outlet on said tank for controlling the outlet flow of pressurized gas from said tank and a regulating valve in line with said control valve operating to maintain the pressure at the desired level and flow rate.

* * * * *